United States Patent
Purdy et al.

(10) Patent No.: US 8,621,066 B2
(45) Date of Patent: Dec. 31, 2013

(54) APPARATUS FOR TRACKING THE DISTRIBUTION OF MEDIA CONTENT

(75) Inventors: Kermit Hal Purdy, Bernardsville, NJ (US); Brian Amento, Morris Plains, NJ (US); Larry Stead, Upper Montclair, NJ (US); Alicia Abella, Morristown, NJ (US); Eric Cheung, New York, NY (US); Mukesh Nathan, Florham Park, NJ (US); Luis Zaman, Haslett, MI (US); Ramon Caceres, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 703 days.

(21) Appl. No.: 12/403,214

(22) Filed: Mar. 12, 2009

(65) Prior Publication Data

US 2010/0235491 A1 Sep. 16, 2010

(51) Int. Cl.
*G06F 15/173* (2006.01)
*G06F 15/177* (2006.01)
*G06F 15/16* (2006.01)

(52) U.S. Cl.
USPC .......................................... 709/224; 709/203

(58) Field of Classification Search
USPC ................. 709/200–203, 217–228
See application file for complete search history.

(56) References Cited

U.S. PATENT DOCUMENTS

| 7,818,764 B2* | 10/2010 | Matz ................................. 725/34 |
| 2007/0179792 A1* | 8/2007 | Kramer ............................... 705/1 |
| 2008/0040354 A1 | 2/2008 | Ray et al. |
| 2008/0162353 A1 | 7/2008 | Tom et al. |
| 2008/0201383 A1* | 8/2008 | Honigfort ........................ 707/200 |
| 2008/0205426 A1* | 8/2008 | Grover et al. .................. 370/429 |
| 2009/0006418 A1 | 1/2009 | O'Malley |
| 2009/0138593 A1* | 5/2009 | Kalavade ........................ 709/224 |
| 2009/0187939 A1* | 7/2009 | Lajoie .............................. 725/34 |
| 2009/0228326 A1* | 9/2009 | White ............................... 705/10 |
| 2010/0058383 A1* | 3/2010 | Chang et al. ..................... 725/35 |
| 2010/0076848 A1* | 3/2010 | Stefanik et al. ............. 705/14.58 |
| 2010/0077308 A1* | 3/2010 | Stefanik et al. ................ 715/733 |

* cited by examiner

*Primary Examiner* — Haresh N Patel
(74) *Attorney, Agent, or Firm* — Guntin & Gust, PLC; Douglas Schnabel

(57) ABSTRACT

A system that incorporates teachings of the present disclosure may include, for example, a recipient client device having a controller operable to receive and store a media object from an originating device, track locations where the media object has been since the media object has been stored in the recipient client device, track identifiers associated with a device or a user that has accessed the media object at the locations, and track and store annotations about the media object by the device or the user that accessed the media object. Other embodiments are disclosed.

10 Claims, 6 Drawing Sheets

US 8,621,066 B2

APPARATUS FOR TRACKING THE DISTRIBUTION OF MEDIA CONTENT

FIELD OF THE DISCLOSURE

The present disclosure relates generally to media distribution and more specifically to media distribution method and devices.

BACKGROUND

Peer-to-peer and ad-hoc communications and distribution of files commonly occur today. Distribution of music files such as iTunes from servers from well known sources such as Apple Computer or MP3 files from Napster, Zune.net or other companies are also ubiquitous. In addition, social networking websites are also proliferating that allow users to comment or create blogs about a myriad of topics. Tracking users, files, and annotations and maintaining statistics is not a focus of many of these systems and thus they mostly fail to provide a user friendly or feasible means for accessing and tracking a plurality of aspects that a community of users may want to research or develop.

DETAILED DESCRIPTION

One embodiment of the present disclosure can entail a server including a controller to receive media content from an originating device, transmit the media content to a recipient device requesting the media content, transmit tracking software to the originating device and the recipient device, track according to tracking information supplied by at least one of the originating device and the recipient device locations where the media content has been distributed to one or more other devices by at least one of the originating device and the recipient device, track according to tracking information supplied by at least one of the other devices locations where the media content has been distributed to yet other devices, and track according to tracking information supplied by at least one of the foregoing devices annotations about the media content.

Another embodiment of the present disclosure can entail a recipient client device operable to have wireless communication with at least a server or another wireless communication device having a controller operable to receive and store a media object from an originating device, track locations where the media object has been since the media object has been stored in the recipient client device, track identifiers associated with a device or a user that has accessed the media object at the locations, and track and store annotations about the media object by the device or the user that accessed the media object.

Yet another embodiment of the present disclosure can entail a computer-readable storage medium having computer instructions to track locations where a media object has been since a media object has been stored at a server, track who has accessed the media object at the locations, and track and store annotations about the media object by those who have accessed the media object. The computer-readable storage medium can include computer instructions to store the media object obtained from an originating device and transmit the media object and tracking software to at least one recipient device.

Yet another embodiment of the present disclosure can entail a computer-readable storage medium at an originating client device having computer instructions to upload a media object to a server for distribution of the media object according to rules stored at the server, and receive tracking software from the server enabling the originating device and other devices in a networked system to track locations where the media object has been since the media object was stored at the server, track who has accessed the media object at the locations as the media object is accessed from device to another device, and track and store annotations about the media object by those who have accessed the media object.

Figure 1:
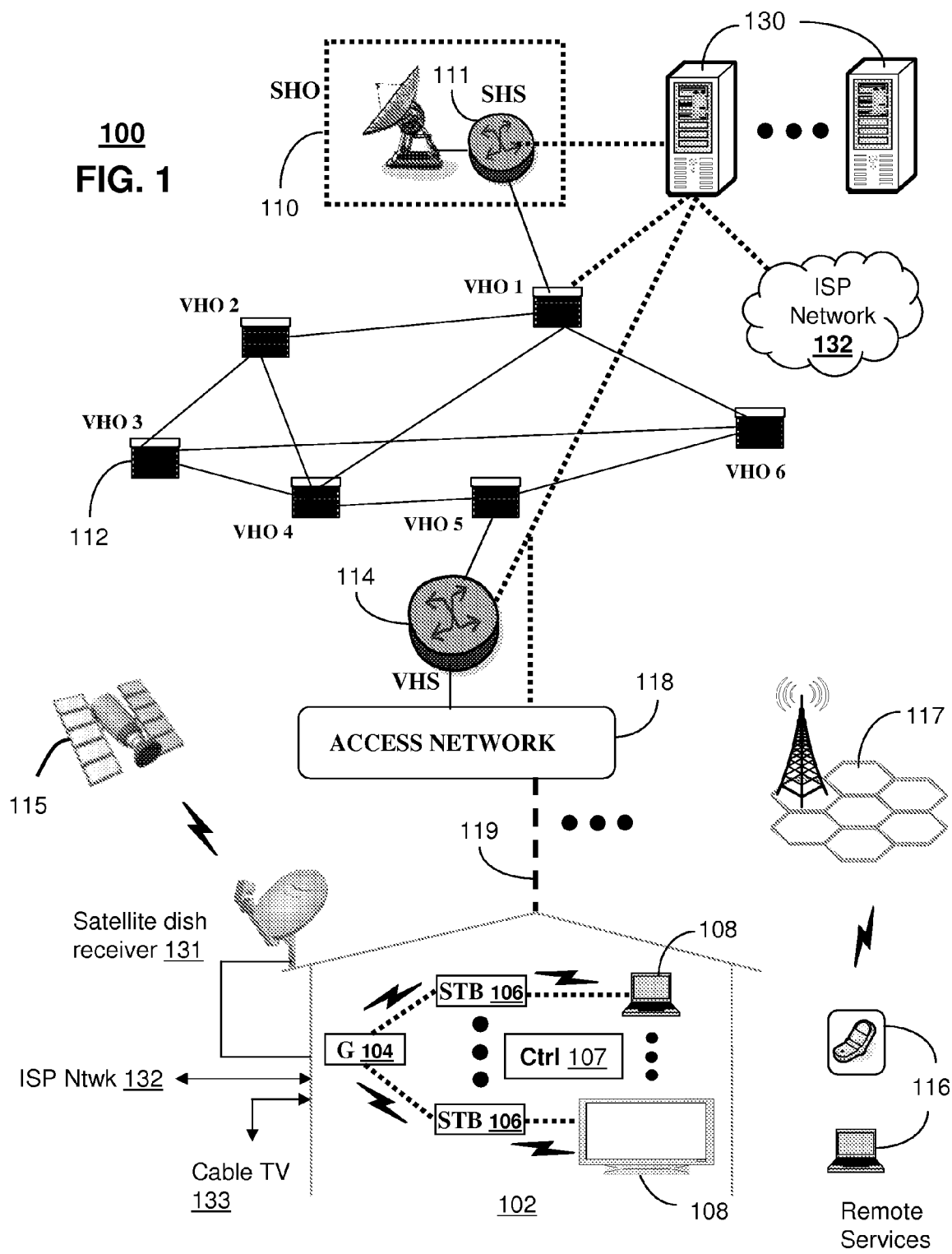
FIG. 1 depicts an illustrative embodiment of a communication system.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content or video content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

Another distinct portion of the computing devices 130 can function as a server (herein referred to as server 130) that stores and distributes media content in accordance with the various embodiments disclosed herein. The server 130 can use computing and communication technology to perform not only the function of distributing media content, but also of distributing tracking software and performing the tracking function itself as well as data collection or consolidation at the server 130 as will be further detailed below.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
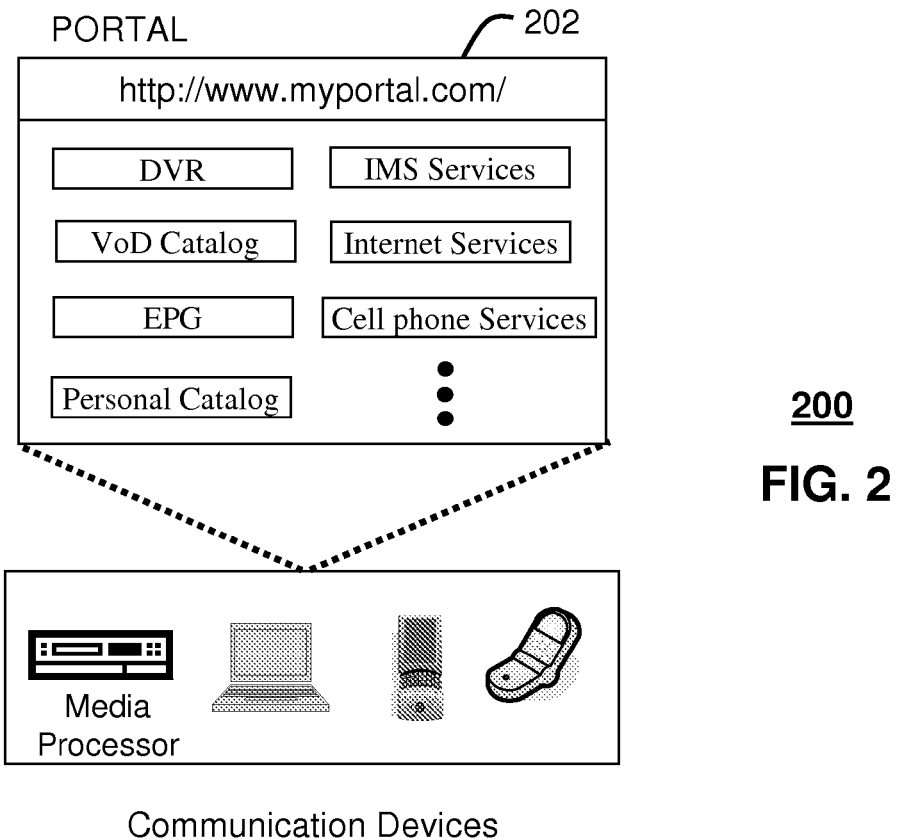
FIG. 2 depicts an illustrative embodiment of a portal interacting with the communication system of FIG. 1.

FIG. 2 depicts an illustrative embodiment of a portal 202 which can operate from the computing devices 130 described earlier of communication 100 illustrated in FIG. 1. The portal 202 can be used for managing services of communication systems 100-200. The portal 202 can be accessed by a Uniform Resource Locator (URL) with a common Internet browser such as Microsoft's Internet Explorer™ using an Internet-capable communication device such as those described for FIGS. 1-2. The portal 202 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 3:
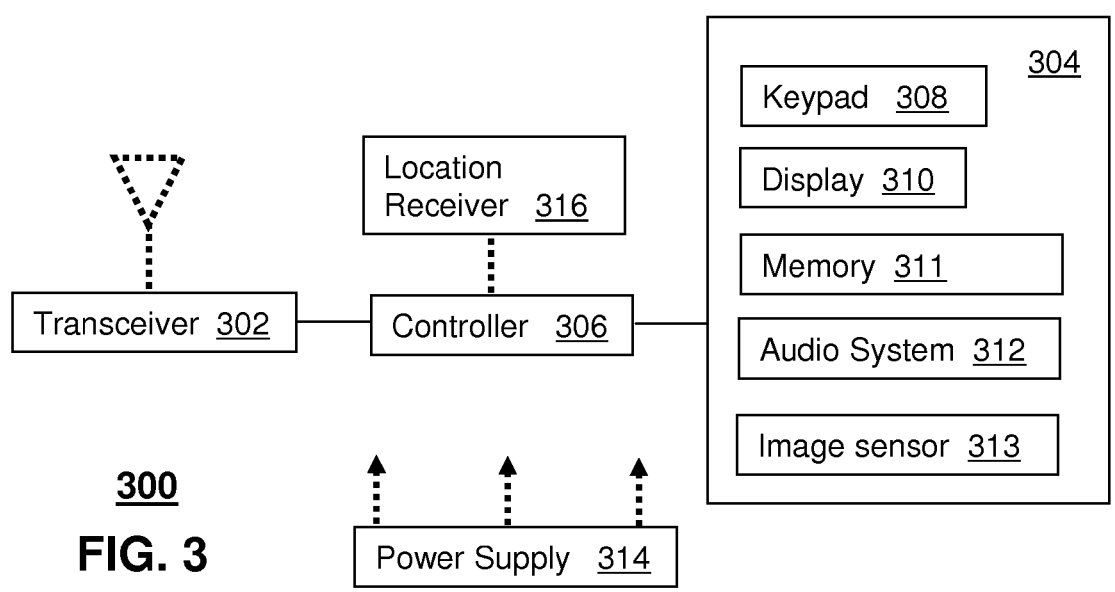
FIG. 3 depicts an illustrative embodiment of a communication device utilized in the communication system of FIG. 1.

FIG. 3 depicts an exemplary embodiment of a communication device 300. Communication 300 can serve in whole or in part as an illustrative embodiment of the communication devices of FIGS. 1-2. The communication device 300 can comprise a wireline and/or wireless transceiver 302 (herein transceiver 302), a user interface (UI) 304, a memory 311, a power supply 314, a location receiver 316, and a controller 306 for managing operations thereof. The transceiver 302 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 302 can also be adapted to support circuit-switched wireline access technologies (such as PSTN), packet-switched wireline access technologies (such as TCPIP, VoIP, etc.), and combinations thereof.

The UI 304 can include a depressible or touch-sensitive keypad 308 with a navigation mechanism such as a roller ball, joystick, mouse, or navigation disk for manipulating operations of the communication device 300. The keypad 308 can be an integral part of a housing assembly of the communication device 300 or an independent device operably coupled thereto by a tethered wireline interface (such as a USB cable) or a wireless interface supporting for example Bluetooth. The keypad 308 can represent a numeric dialing keypad commonly used by phones, and/or a Qwerty keypad with alphanumeric keys. The UI 304 can further include a display 310 such as monochrome or color LCD (Liquid Crystal Display), OLED (Organic Light Emitting Diode) or other suitable display technology for conveying images to an end user of the communication device 300. In an embodiment where the display 310 is touch-sensitive, a portion or all of the keypad 308 can be presented by way of the display. The memory 311 can store media objects or media content as well tracking software as discussed with respect to the various embodiments herein.

The UI 304 can also include an audio system 312 that utilizes common audio technology for conveying low volume audio (such as audio heard only in the proximity of a human ear) and high volume audio (such as speakerphone for hands free operation). The audio system 312 can further include a microphone for receiving audible signals of an end user. The audio system 312 can also be used for voice recognition applications. The UI 304 can further include an image sensor 313 such as a charged coupled device (CCD) camera for capturing still or moving images.

The power supply 314 can utilize common power management technologies such as replaceable and rechargeable batteries, supply regulation technologies, and charging system technologies for supplying energy to the components of the communication device 300 to facilitate long-range or short-range portable applications. The location receiver 316 can utilize common location technology such as a global positioning system (GPS) receiver for identifying a location of the communication device 100 based on signals generated by a constellation of GPS satellites, thereby facilitating common location services such as navigation.

The communication device 100 can use the transceiver 302 to also determine a proximity to a cellular, WiFi or Bluetooth access point by common power sensing techniques such as utilizing a received signal strength indicator (RSSI) and/or a signal time of arrival (TOA) or time of flight (TOF). Whether by GPS, TOA, TOF, triangulation or other techniques, any one of these geolocation technologies can be used to obtain or approximate location information. The controller 306 can utilize computing technologies such as a microprocessor, a digital signal processor (DSP), and/or a video processor with associated storage memory such a Flash, ROM, RAM, SRAM, DRAM or other storage technologies.

The communication device 300 can be adapted to perform the functions of the media processor 106, the media devices 108, or the portable communication devices 116 of FIG. 1. It will be appreciated that the communication device 300 can also represent other common devices that can operate in communication systems 100 of FIG. 1 such as a gaming console and a media player.

Figure 4:
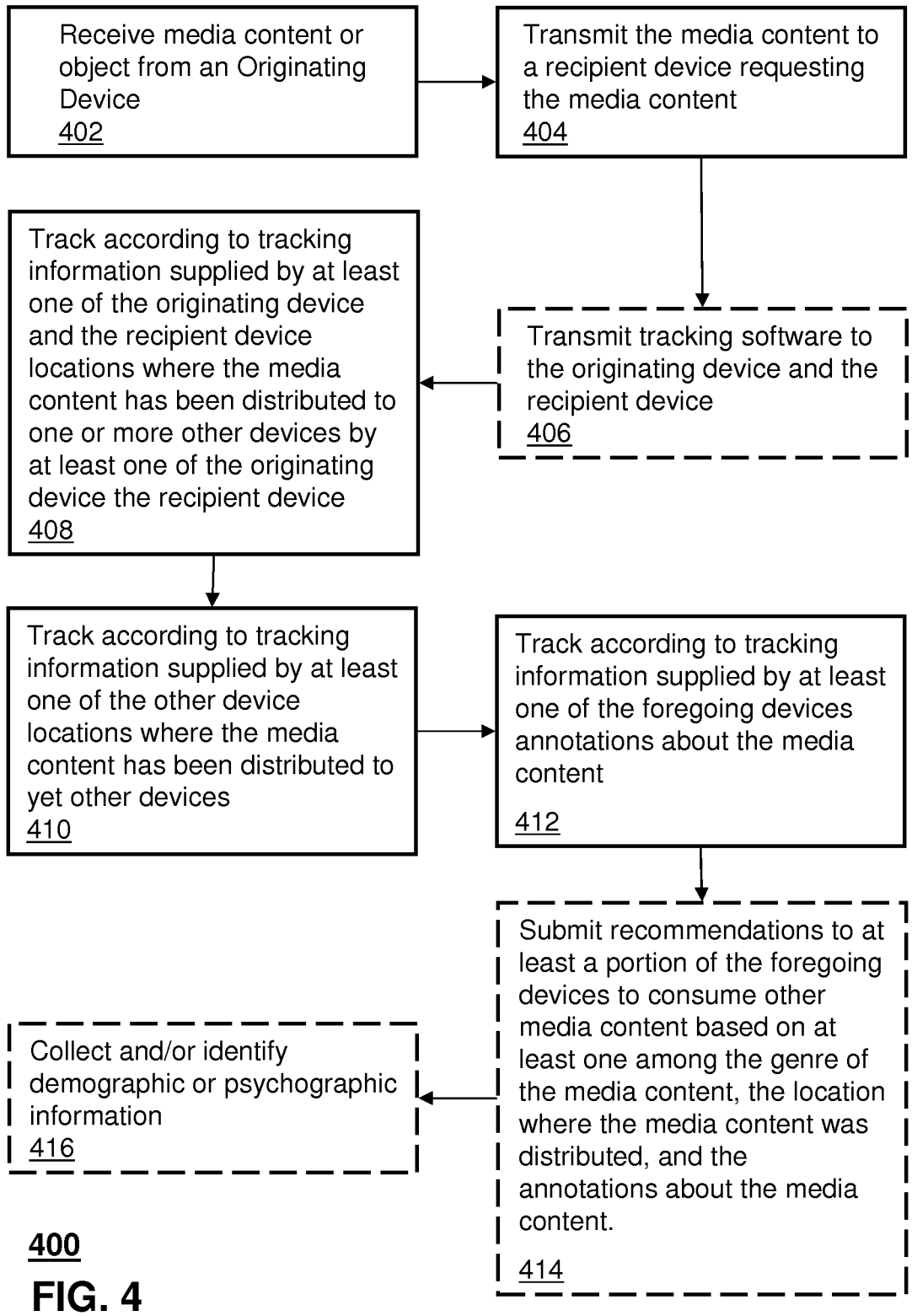
FIG. 4 depicts an illustrative embodiment of a method operating in portions of the communication system of FIG. 1.

FIG. 4 depicts an illustrative method 400 that operates in portions of the communication system of FIG. 1. Method 400 can begin with step 402 in which a device receives media content from an originating device which gets transmitted at 404 to a recipient device requesting the media content. At 406, tracking software can be transmitted to the originating device and the recipient device, and at 408, the locations where the media content (or objects) has been distributed to one or more other devices by at least one of the originating device or recipient device is tracked. Note that sending tracking software to the user devices is optional since the mere act of downloading or uploading from any number of servers for example can be used for tracking purposes. The method 400 can also track at 412 according to tracking information supplied by at least one of the foregoing devices annotations about the media content. At 414, the method can enable the submission of recommendations to at least a portion of the foregoing devices to consume other media content based on at least one among the genre of the media content, the location where the media content was distributed, and the annotations about the media content. The method can further collect and/or identify demographic or psychographic information at 416.

Upon reviewing the aforementioned embodiments, it would be evident to an artisan with ordinary skill in the art that the embodiments can be modified, reduced, or enhanced without departing from the scope and spirit of the claims described below. For example, the memory size may not necessarily require a large memory or alternatively, external memory associated with the media content and tracking function can be embodied in any number or forms and sizes.

Other suitable modifications can be applied to the present disclosure without departing from the scope of the claims below. Accordingly, the reader is directed to the claims section for a fuller understanding of the breadth and scope of the present disclosure.

Figure 5:
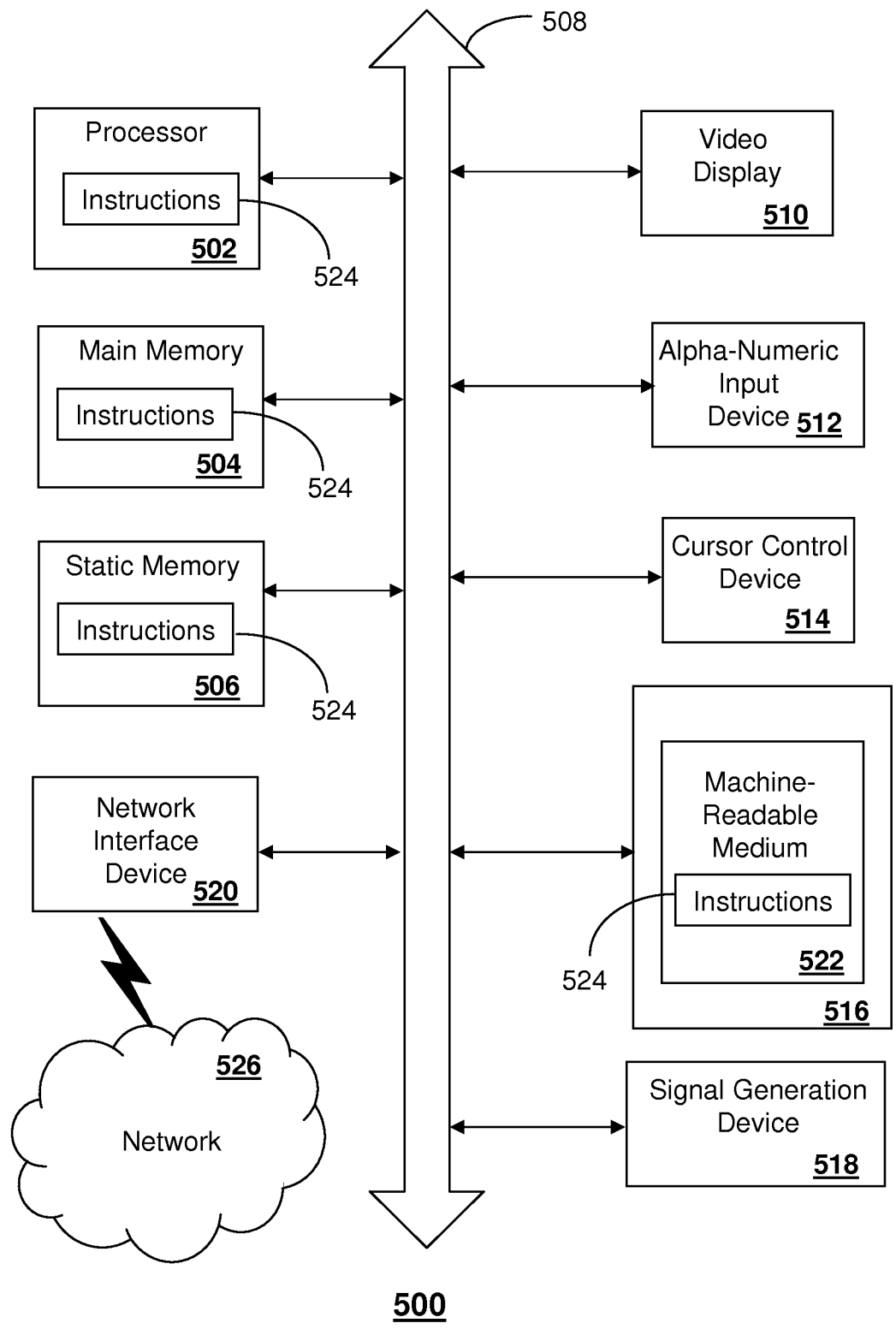
FIG. 5 is a diagrammatic representation of a machine in the form of a computer system within which a set of instructions, when executed, may cause the machine to perform any one or more of the methodologies discussed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Figure 6:
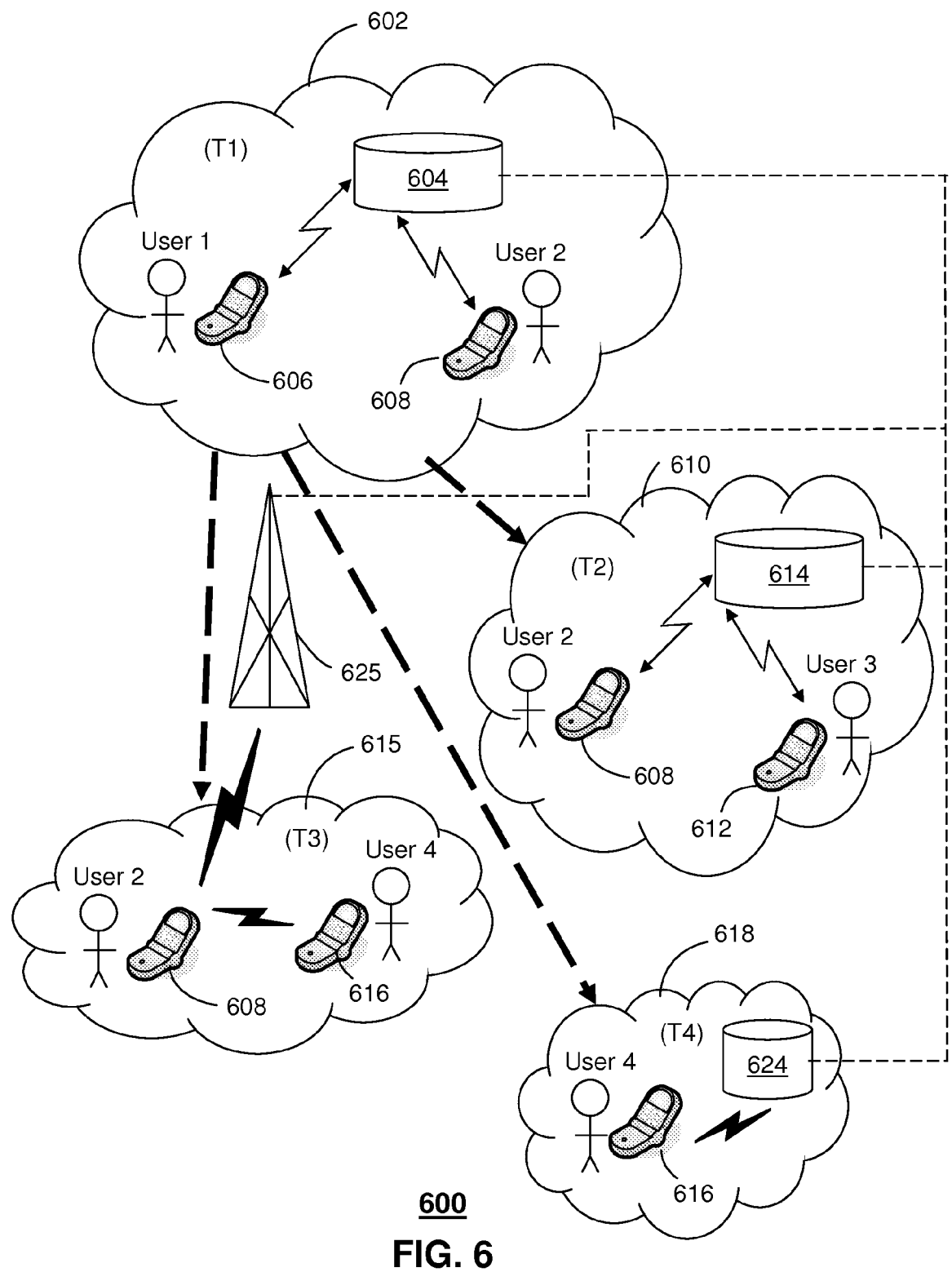
FIG. 6 is another illustrative embodiment of a communication system which can perform in accordance with an embodiment herein.

Referring to FIG. 6, a communication system 600 can include a plurality of portable communication devices 606, 608, 612, and 616 belonging to four users. The portable communication devices can provide location information by entering into one of various proximities or local area networks 602, 610 or 618 and communicating with respective servers 604, 614 or 624. The portable communication devices can communicate with each other or with a network via local area networks or personal area networks using any number of communication protocols such as WiFi, Bluetooth, Zigbee, or WiMAX to name a few. Cellular communication can also be used via base stations 625. Location information can also be obtained by using GPS, time of arrival or triangulation techniques at the portable communication devices or using other location determination techniques. In one scenario, an ad-hoc network 615 can exist between two portable communication devices 608 and 616. The location information relating to an exchange between devices 608 and 616 can be transferred to a central server once one of the devices (608 or 616) enters a local area network such as proximity 618 having server 624. The server 624 can be networked to other servers and information can be stored centrally at one or more of the servers 604, 614 or 624. In the instances where a device has wide area communication capabilities such as cellular, information can be sent to the servers via base station 625 for example.

In one scenario (T1), User 1 can be the author of an original work such as a song, a music video, a movie or movie clip or even a photograph or an electronic book. In other words, User 1 can be an author of media content. User 1 can have the media content on their portable communication device 606 and they can upload the media content to the server 604 when the device 606 is within the local area network 602. The local area network 604 can represent a bookstore, a library, a coffee shop or any number of specific locations as designated by the server 604 and its location. A second user having device 608 and entering the local area network 602 can obtain access to the media content created by User 1 and uploaded to server 604. The server 604 will define the rights management that will enable the media content (or a media object) to be distributed among a plurality of users and devices. Note that the media object can be the media content itself or a pointer to or an identifier of media content The server 604 will also distribute tracking software to the portable communication devices to enable the various tracking functions described above. The second user with device 608 can gain access to the media content by downloading the media content itself from the server or downloading a media object serving as a pointer to the media content stored at a server.

As the second user and device 608 travels to another local area network 610 at a different time (T2), the device 608 can share the media content or media object with yet another user (User 3) and portable communication device 612 as similarly done in local area network 602. As the second user and device 608 continues on their travels to yet another area represented by ad-hoc network 615 and time T3, the second user can transfer the tracking software and the media content or the media object to yet another user (User 4) and portable communication device 616. Although no server is involved in this transfer, both devices will need to be adequately equipped with compatible communication protocols. The devices should also have location determining devices such as GPS although it can be contemplated within the scope of the embodiments that only one device in the local area network may have location determining means. As User 4 and device 616 continues on their travels to another local area network 618 at time T4, the location information and any other tracked information that occurred at time T3 as well as time T4 can be relayed to a central server via the server 624. Alternatively, the tracked information at T3 can be sent via cellular (via base station 625) to a central server if one of the portable devices is enabled and programmed to use such communication resources.

Figure 7:
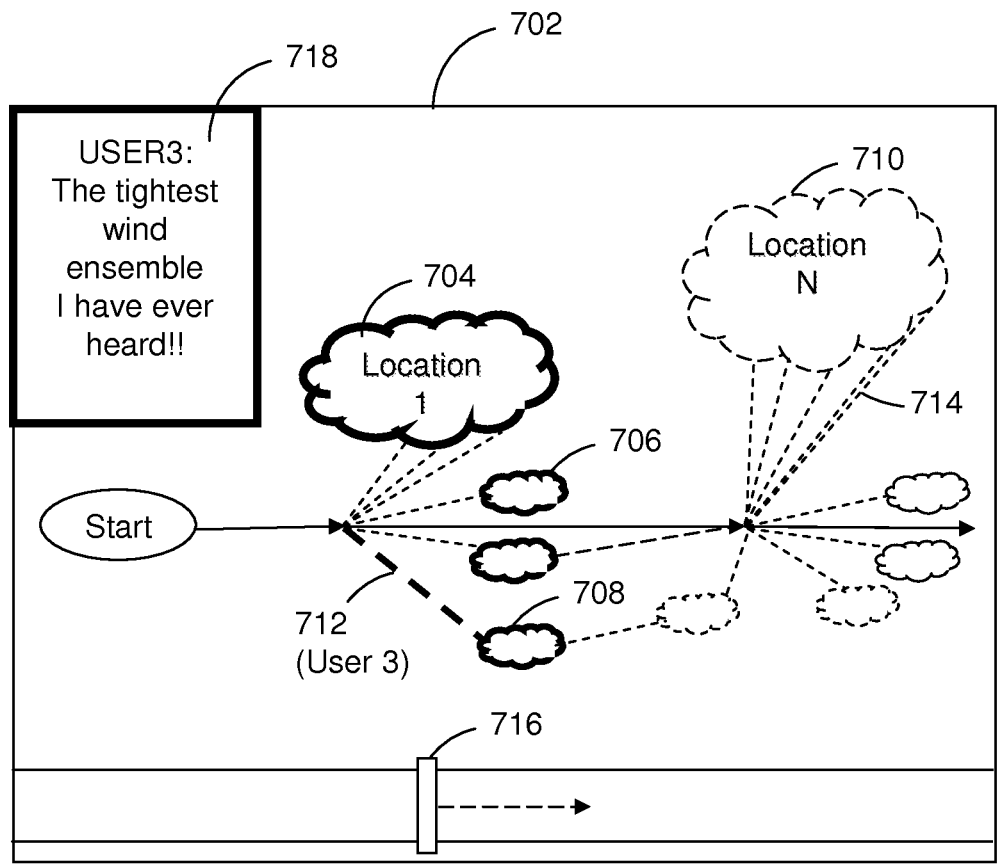
FIG. 7 depicts a graphical user interface representing an graphical output of tracking and statistical data related to the illustrative methods herein.

The information tracked by the portable communication devices and servers illustrated in FIG. 6 can be represented in any number of ways. Referring to FIG. 7 and graphical user interface 700, one example of how the tracked information can be represented is shown. The graphical user interface 700 can be part of a screen 702 that highlights a timeline as a slider 716 is moved to the right of the screen 702. The graphical user interface can represent the various users or "couriers" (712, 714) represented by dashed lines that have carried and transferred the media content or media object to various locations. The locations can be represented by various clouds 704, 706, 708, and 710 that can change in size or color based on the number of copies of the media content or media objects have been carried by couriers to the various locations. The graphical user interface of FIG. 7 thus can provide a graphical representation of the statistics of how a particular media content has proliferated geographically. Thus, a musician can instantly determine where their work has become most popular or at least listened to most frequently. This tool can be used to determine an author's potential concert tour destinations based on the number of transfers represented on the graphical user interface. The graphical user interface can also enable the viewing of user annotations or comments about the media content of interest. For example, a particular user (User 3) 712 can be highlighted and their annotations can show up in a pop-up box or designated area 718 of the screen 702. It should be understood that this is just merely one representation of illustrating the information tracked and any number of representations are contemplated by the embodiments herein.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server, comprising:
   a memory comprising computer instructions; and
   a controller coupled to the memory, wherein when the computer instructions are executed by the controller, the controller performs operations comprising:
   receiving media content from an originating device;
   transmitting tracking software and the media content to a recipient device requesting the media content, wherein the tracking software comprises computer instructions for storage in a first computer-readable storage medium of the recipient device for execution by a first processor of the recipient device;
   transmitting the tracking software to the originating device, wherein the tracking software comprises computer instructions for storage in a second computer-readable storage medium of the originating device for execution by a second processor of the originating device;
   tracking, according to first tracking information supplied by at least one of the originating device and the recipient device, locations where the media content has been distributed to at least one other device by at least one of the originating device and the recipient device;
   tracking, according to tracking information supplied by at least one of the other devices, locations where the media content has been distributed to yet other devices;
   tracking, according to at least one of the first or the second tracking information supplied by at least one of the foregoing devices annotations about the media content; and
   tracking a travel path of the media content by obtaining geolocation information from the foregoing devices.

2. The server of claim 1, wherein the controller further performs operations comprising tracking locations of the media content by obtaining at least one of the geolocation information from the foregoing devices or location identifiers associated with a local area network where the distribution of the media content took place.

3. The server of claim 1, wherein the server is part of a network of a plurality of servers sharing tracking information supplied by the tracking software operating in the foregoing devices.

4. The server of claim 1, wherein the tracking software operating in the foregoing devices collects demographic information, and wherein the controller further performs operations comprising receiving the demographic information.

5. The server of claim 1, wherein the media content comprises one of audio content, image content, and a combination thereof.

6. The server of claim 1, wherein the controller further performs operations comprising submitting recommendations to at least a portion of the foregoing devices to consume other media content based on at least one of a genre of the media content, the location where the media content was distributed, and the annotations about the media content.

7. The server of claim 1, wherein the foregoing devices receive the tracking software with the distributed media content.

8. The server of claim 1, wherein the controller further performs operations comprising identifying at least one of demographic patterns or psychographic patterns from at least one of the first or the second tracking information received from at least a portion of the foregoing devices.

9. The server of claim 8, wherein the controller further performs operations comprising sharing at least one of the demographic patterns or psychographic patterns with at least one of an author of the media content, and a population of recipients of the media content.

10. The server of claim 1, wherein the tracking of the travel path further comprises tracking the travel path by obtaining location identifiers associated with a network element where the foregoing devices receive communication services.

* * * * *